United States Patent
Lindsey et al.

(10) Patent No.: US 11,834,086 B2
(45) Date of Patent: Dec. 5, 2023

(54) GRILL ACCESSORY CART

(71) Applicant: Channel Products, Inc., Solon, OH (US)

(72) Inventors: Teresa Lindsey, Bratenahl, OH (US); Richard Pennell, Cleveland, OH (US); Patrick W. Brown, Cleveland Heights, OH (US); Peter N. Whitworth, Northfield, OH (US); Jamie A. Horvath, Twinsburg, OH (US)

(73) Assignee: Channel Products, Inc., Solon, OH (US)

( * ) Notice: Subject to any disclaimer, the term of this patent is extended or adjusted under 35 U.S.C. 154(b) by 291 days.

(21) Appl. No.: 16/815,731

(22) Filed: Mar. 11, 2020

(65) Prior Publication Data

US 2021/0284215 A1    Sep. 16, 2021

(51) Int. Cl.
*B62B 3/00* (2006.01)
*B62B 3/02* (2006.01)
*A47B 31/00* (2006.01)
*A47J 37/06* (2006.01)

(52) U.S. Cl.
CPC .............. *B62B 3/005* (2013.01); *A47B 31/00* (2013.01); *B62B 3/02* (2013.01); *A47B 2031/002* (2013.01); *A47B 2031/003* (2013.01); *A47J 37/0664* (2013.01)

(58) Field of Classification Search
CPC ....... B62B 3/005; B62B 3/02; B62B 2206/06; A47B 31/00; A47B 2031/002; A47B 2031/003; A47J 37/0664; A47J 37/0786
See application file for complete search history.

(56) References Cited

U.S. PATENT DOCUMENTS

| | | |
|---|---|---|
| D185,939 S | 8/1959 | Frick |
| D234,078 S | 1/1975 | Emanuele |
| D254,468 S | 3/1980 | Cox |
| D272,111 S | 1/1984 | Anzalone |
| 5,302,014 A * | 4/1994 | Hobson ............ A47B 31/00 211/70.6 |
| D383,583 S | 9/1997 | Ashinhurst |
| D406,354 S | 3/1999 | Horton |
| D409,810 S | 5/1999 | Ambrose |
| D683,513 S | 5/2013 | Wei et al. |
| D886,403 S | 6/2020 | Heck et al. |
| D927,116 S | 8/2021 | Demartini |

(Continued)

*Primary Examiner* — James A English
*Assistant Examiner* — James J Triggs
(74) *Attorney, Agent, or Firm* — Tucker Ellis LLP; Heather M. Barnes; Michael G. Craig

(57) ABSTRACT

One or more techniques and/or systems are disclosed for a cart, such as an accessory or utility cart, that may be used in conjunction with an outdoor grill or outdoor kitchen area. The cart can be stowed in a lowered position such that it may effectively fit underneath a side shelf of a standard outdoor grill. The cart can comprise a top and base section, where the top section is selectably extendable from the base section between a lowered and raised position. Further the top section can have a top working surface with at least one foldable wing, which can be extended or stowed into a recess in the base section in the lowered position. The base section can comprise a utility compartment for storage, and wheel to provide portability.

20 Claims, 14 Drawing Sheets

(56) References Cited

U.S. PATENT DOCUMENTS

| 2006/0024212 A1* | 2/2006 | Hwang ................... B01L 9/02 422/400 |
| 2020/0297109 A1 | 9/2020 | Wise |
| 2021/0068532 A1 | 3/2021 | Blewett et al. |

* cited by examiner

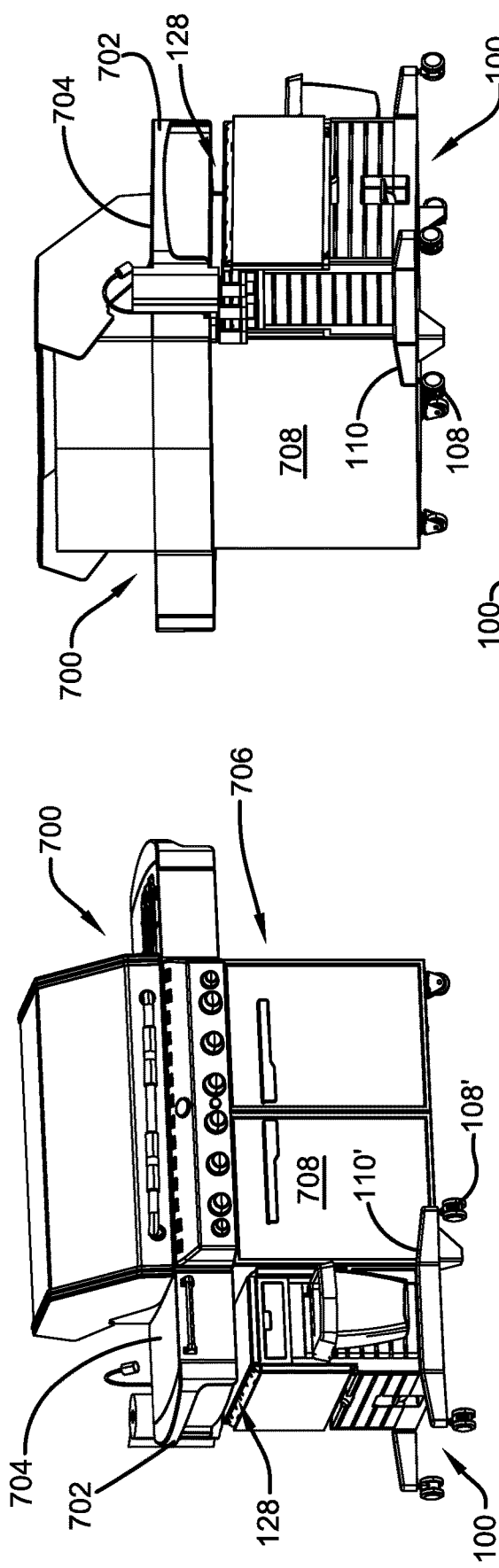
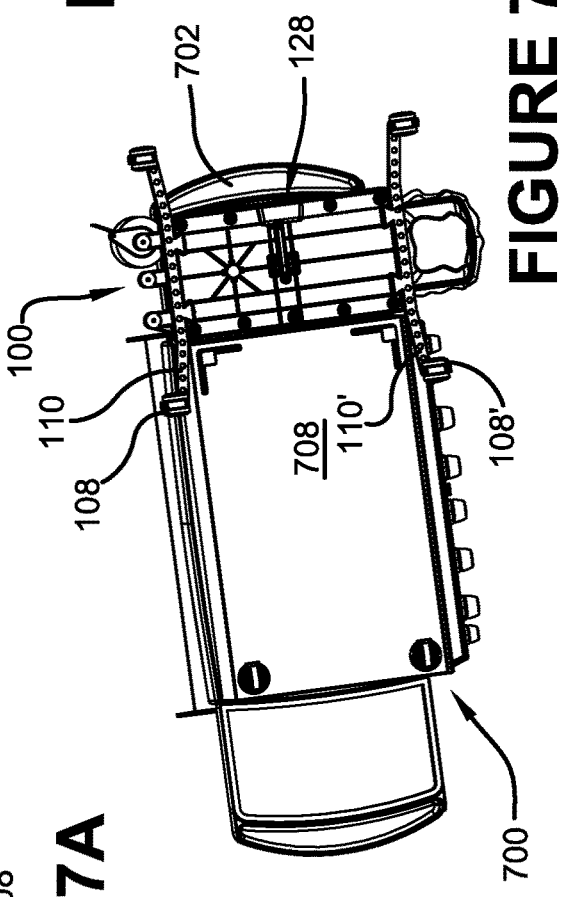
FIGURE 7A
FIGURE 7B
FIGURE 7C

GRILL ACCESSORY CART

BACKGROUND

Outdoor appliances, such as grills and other cooking systems, can be used outdoors to prepare food. Utility carts can be used to transport and/or store utensils, tools and food that may be used during food prep. Further, food preparation and food service may utilize countertops or shelves, such as attached to a grill, or in an outdoor kitchen. Additionally, storage of items outdoors can be an issue when space is limited and protection from the outdoor environment is desired.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a cart, such as an accessory or utility cart, that may be used in conjunction with an outdoor grill or outdoor kitchen area, which can be effectively stowed and stored in a compact disposition. For example, the cart may be raised for use, and lowered for storage. Further, the cart can comprise an expandable top working surface, with a fixed surface and an expandable portion. The cart may have one or more compartments, and is sized to fit under a grill shelf when stowed. Additionally, the cart can have convenient and simple ways to attach accessories during use.

In one implementation, a cart can comprise a base section. The base section can comprise a base compartment that is accessible by an access door. The base utility compartment can be configured to selectably receive and hold one or more trays. The base section can comprise a set of two or more wheels that are respectively disposed at a bottom of the base section. Further, the base section can comprise a plurality of slats that are disposed on an exterior of the base portion, and are configured to selectably receive and hold one or more accessories. Additionally, in this implementation, the cart can comprise a top section that is operably disposed above the base portion. The top section can be selectably extendable from the base section between a lowered first position and a raised second position. The top section can comprise a top working surface, where the top working surface comprises a first foldable wing that is selectably foldable between a stowed first position and an extended second position. In some implementations, a first side wall of the base section can comprise a first external recess that is configured to receive the first foldable wing in the stowed first position.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 7A, 7B and 7C are component diagrams illustrating various views of one implementation of an example cart in accordance with one or more systems described herein.

DETAILED DESCRIPTION

Figure 1A:
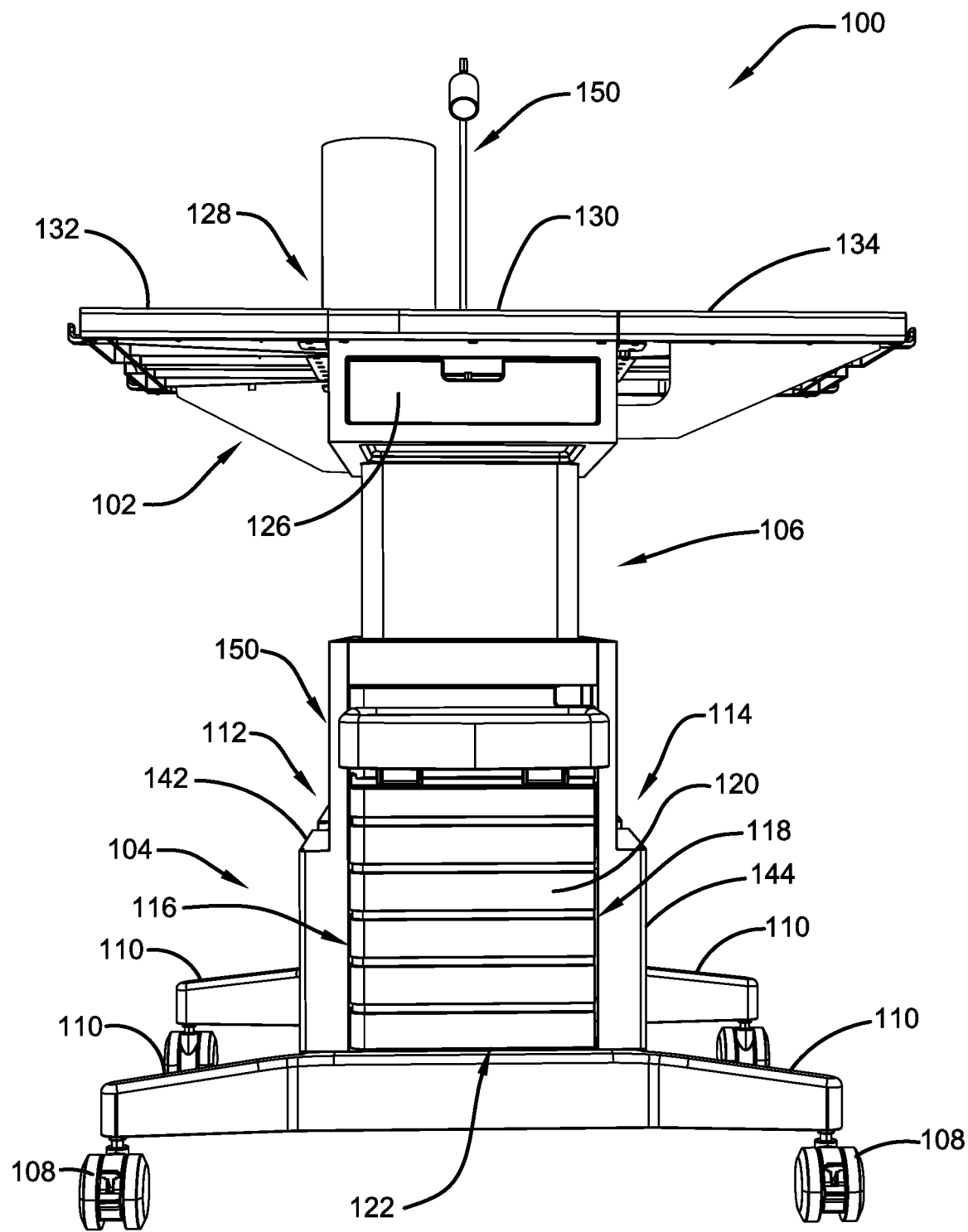
FIGS. 1A, 1B, 1C, and 1D are component diagrams illustrating various views of a cart in accordance with one or more devices described herein.
Figure 1B:
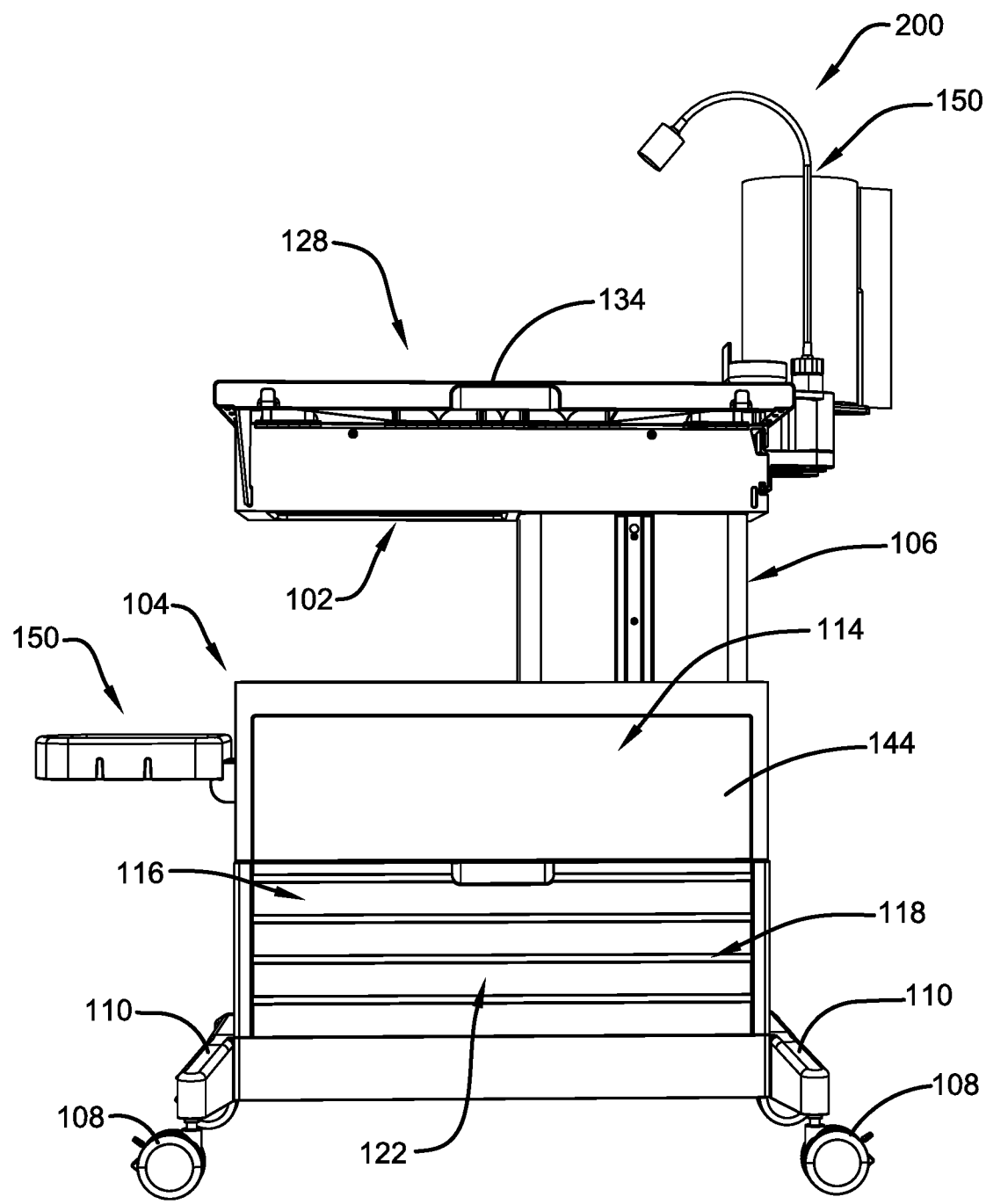
Figure 1C:
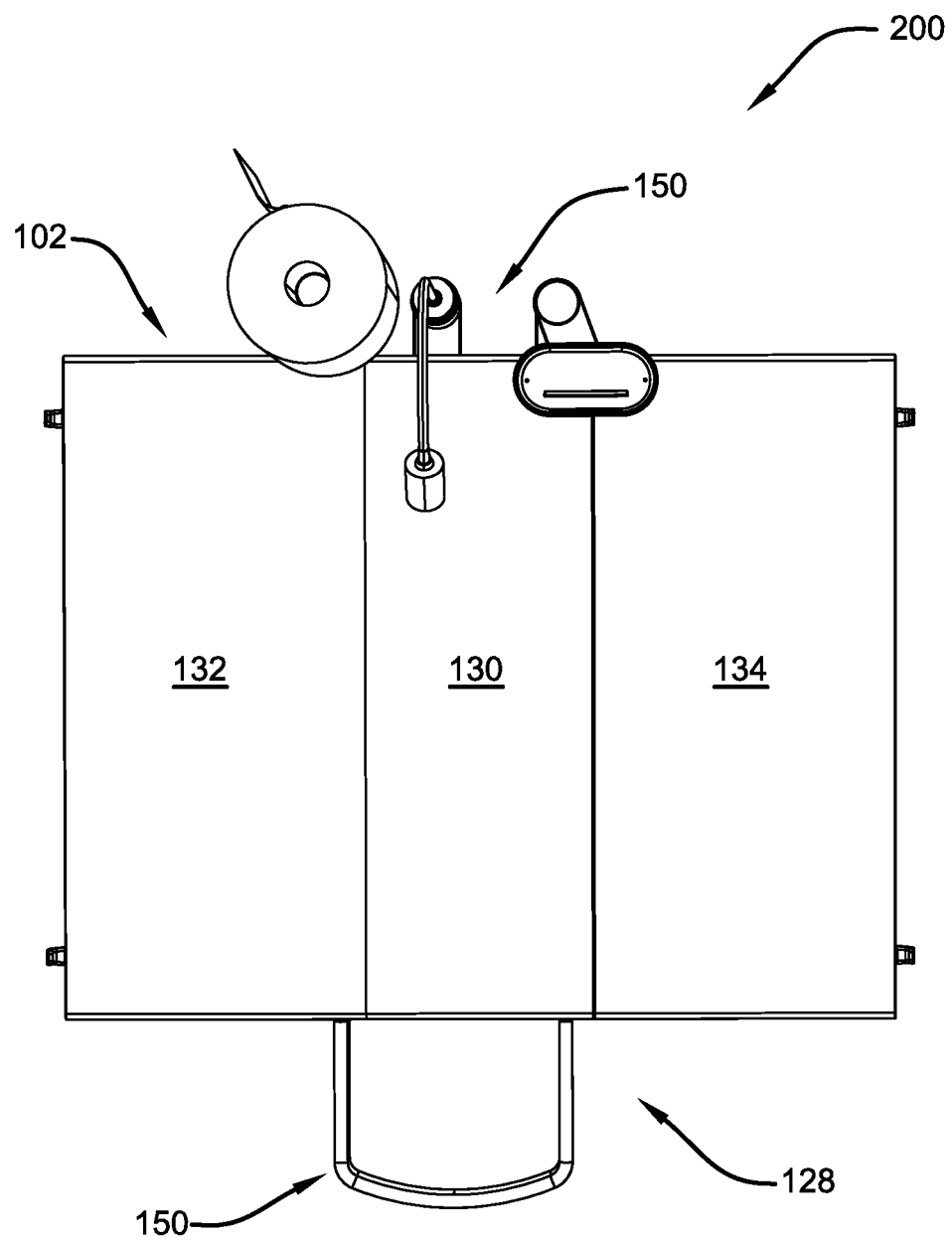
Figure 1D:
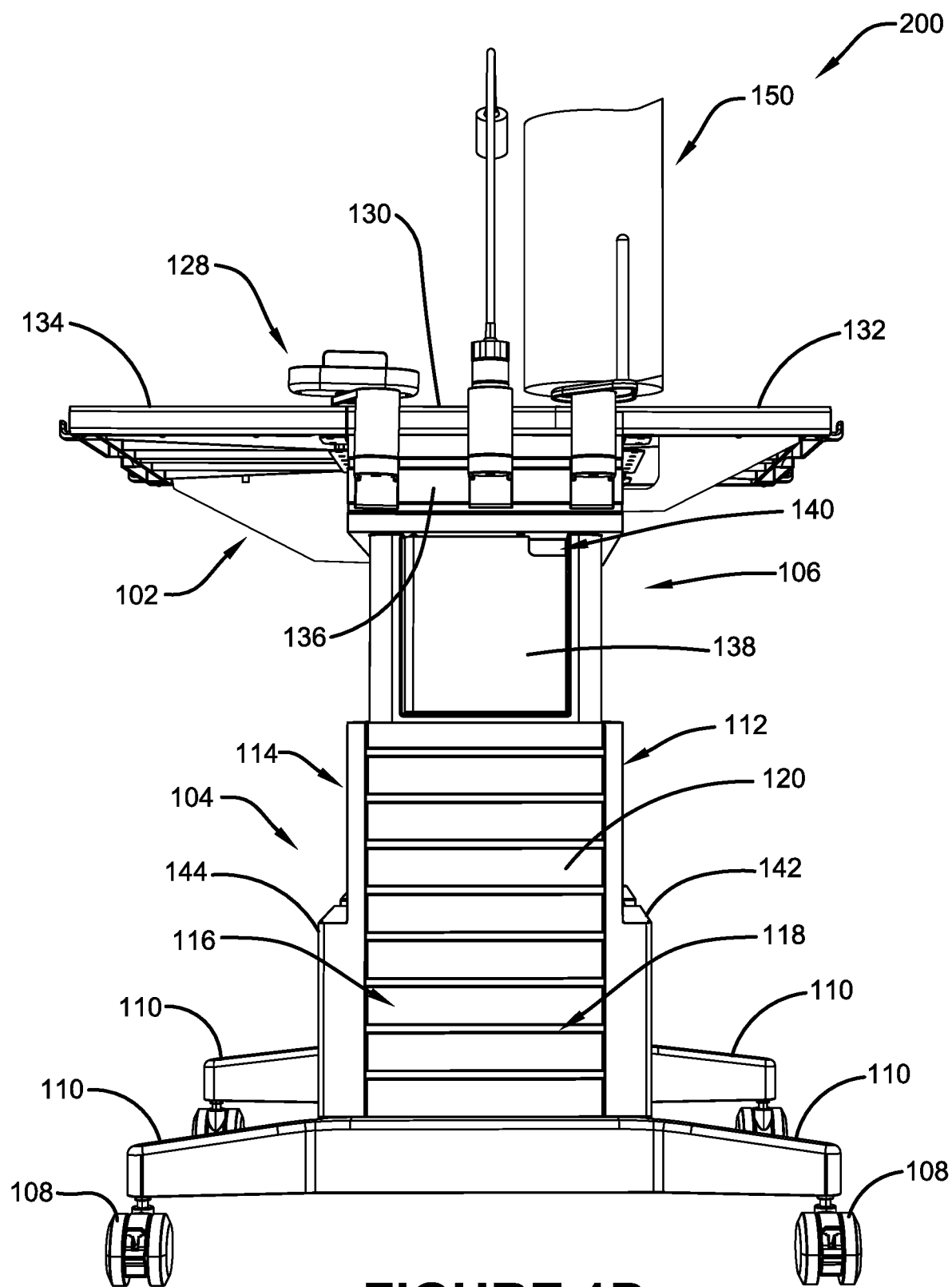

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

In one aspect, a utility-type cart, such as a portable wheeled cart, utility cart, or otherwise accessory cart, can be devised that allows for improved utility and storage when used with an outdoor cooking appliance, such as a grill. In this aspect, the devised cart can be selectively lowered and raised, for example, such that the raised height provides a working surface that is similar to a grill's side shelves (e.g., standard countertop height); and the lowered height allows the cart to be stored underneath the grill's shelf. Further, in this aspect, the cart may provide for selectably sized top working surfaces, one or more storage compartments, an exterior that provides for selectable attachment of accessories, and wheels that can be stowed on either side of a grill.

One example implementation of a utility-type cart is shown in the component diagram of FIGS. 1A, 1B, 1C, and 1D, which illustrate an exemplary cart 100 that may be used with an outdoor cooking appliance. In this implementation, the cart 100 can comprise a top section 102, and a base section 104. The base section 104 can comprise an internal utility compartment 122 that is selectably accessible by an access door 120. The access door 120 can be disposed at a front of the base cabinet 104. Further, the utility compartment 122 can be configured to selectably receive and hold one or more trays (e.g., shelves, trays, etc.). For example, horizontal grooves may be disposed along the inside side walls 142, 144 of the base section 104 to receive and hold shelves, trays or drawers.

As illustrated, in this implementation, the top section 102 can be operably disposed above (e.g., over) the base section 104. The top section 102 is selectably extendable from the base section 104 between a lowered first position and a raised second position (e.g., as shown in FIGS. 1A-D). The top section 102 can comprise a top working surface 128, for example, that can act as a shelf, counter, or table-top for holding items, and/or performing tasks related to outdoor cooking. The top working surface may typically comprise a flat shelf or countertop like surface, which can operably approximate a same height (when extended) as a shelf or countertop of a standard outdoor appliance or outdoor kitchen counter top.

In this implementation, the top working surface 128 can comprise a fixed working surface 130 and one or more foldable wings or working surfaces. That is, the top working surface 128 can comprise a first foldable wing 132 (a.k.a. first folding work surface); and in some implementations, can comprise a second foldable wing 134 (a.k.a. second folding work surface). In this way, for example, a central portion of the working surface 128 can be fixed in place, and one or more wings 132, 134 can be extended or stowed to selectably adjust an area of the top working surface 128.

Therefore, the top section 102 can comprise a top working surface 128 that comprises a first foldable wing 132, which is selectably foldable between a stowed first position and an extended second position. The stowed first position can dispose the first foldable wing 132 (a.k.a. first folding work surface) downward, and the extended position can dispose the first foldable wing 132 (a.k.a. first folding work surface) up in a horizontal disposition, substantially planar with the fixed working surface 130. In some implementations, the top working surface 128 comprises the second foldable wing 134 that is selectably foldable between a stowed third position and an extended fourth position.

In this implementation, the base section can comprise a first side wall 142, and a second side wall 144. Further, the first side wall 142 can comprise a first external recess 112 that is configured to receive the first foldable wing 132 in the stowed first position. That is, for example, when the first foldable wing 132 is stowed it can be disposed in the first external recess 112 that is shaped and sized to receive the first foldable wing 132 in the stowed position. In some implementations, the second external side wall 144 can comprise a second external recess 114 that is configured to receive the second foldable wing 134 in a stowed third position. In this implementation, the second foldable wing 134 is selectably foldable between the stowed third position and an extended fourth position. In some implementations, as illustrated, the respective first side wall 142 and second side wall 144 can comprise a cut out disposed proximate the bottom of the associated external recess 112, 114, for example, to provide user access to the associated folding wing 132, 134. Further, respective wings 132, 134 may comprise cut out handles to facilitate moving between the stowed and extended positions.

Additionally, the top section 102 can be selectably extendable from the base section 104 between a lowered first position and a raised second position (e.g., as shown in FIGS. 1A-D). In some implementations, the lowered first position can all for the cart to be disposed at a total height that is sized to fit the cart underneath a standard height side shelf on an outdoor grill. For example, the top section 102 can be lowered to the lowered first position, and the cart may be stored underneath a side shelf of a grill, or some similar height shelf, such as of a counter for an outdoor kitchen. In this way, the height of the cart can clear under a standard height shelf or counter of an outdoor grill.

As illustrated in FIGS. 1A-D, the exemplary cart 100 can comprise a neck section 106. The neck section 106 can be engaged with, and disposed between, the top section and the bottom section. Further, the neck section 106 can operably telescope out of the base section 104 to translate the top section 102 between the lowered first position and the raised second position. That is, for example, the neck 106 may telescope into the base section 104 when translating between the raised position and the lowered position; and the neck 106 can be disposed in the base section 104 when the cart is disposed in the lowered position. In some implementations, the neck section 106 can comprise a rear compartment 140 that is accessible from the rear of the neck section 106. A rear access door 138 may be used to access the rear compartment 140, such as when the cart 100 is disposed in the raised position. When the cart 100 is disposed in the lowered position, the rear compartment may be disposed in the base section 104.

As illustrated in FIGS. 1A-D, the base section 104 can comprise a set of two or more wheels 108 that are disposed at a bottom of the base section 104. For examples, the wheels can be used to move or transport the cart along a surface. In some implementations, at least two of the wheels 108 can respectively be disposed on a leg 110. The leg(s) 110 can extend horizontally from the base section 104, and the respective legs 110 may be spaced apart to operably fit a side of a standard sized outdoor grill there between. That is, for example, the distance between two legs 110 on one side of the base section 104 is sufficiently sized to fit the width of a side of a standard sized outdoor grill. In this example, such as when the cart 100 is disposed in the lowered position, the cart 100 may be wheeled underneath a side shelf of the grill, and the legs can be disposed on either side of the grill. As an example, this may allow the cart 100 to be stowed under (at least partially) the side shelf of the grill for convenience and efficient storage.

As illustrated in FIGS. 1A-D, the base section 104 can comprise a plurality of slats 116 that are disposed on an exterior of the base section 104. The slats 116 can be configured to selectably receive and hold one or more accessories 150. As illustrated, the slats 116 may be spaced apart to allow an engagement portion of an accessory 150 to engage with (e.g., hook onto) the slat 116, and operably hold it in place during use. For example, the accessory 150 can comprise a trash can or trash can liner holder, which can be hooked onto the slat 116 for use at a desired location. In some implementations, the exterior of the base section 104 can comprise horizontal grooves 118 (e.g., spaces between slats 116), which can be used to selectably receive and hold accessories 150 at a desired location (e.g., variable locations).

In some implementations, the top section 102 can comprise a drawer 126 that is accessible from a front of the top section 102. For example, the drawer can be disposed in an internal recess in the top section 102, disposed below the top working surface 128. Further, the base section 104 can comprise a third external recess 124 disposed in a top wall of the base section. The third external recess 124 can be configured to operably hold a selectably removable cutting board. Additionally, the top section 102 can comprise an accessory attachment panel 136 disposed at a rear side of the top section 102, proximate the top working surface 128. The accessory attachment panel 136 can be configured to operably hold one or more accessories 150 (e.g., paper towel holder, light, tray, etc.) that are accessible from the top working surface 128. For example, the accessory attachment panel 136 can comprise a horizontal groove and slat system, as described above, where an accessory 150 can be selectably engaged. As another example, the accessory attachment panel 136 can comprise a magnetic-based holder that selectably holds a magnetically based (e.g., magnetic metal) accessory. In some implementations, accessory attachment components, such as hooks, etc., can be disposed at or proximate the top working surface 128 to operably hold accessories, such as utensils, openers, tools, etc.

Figure 2A:
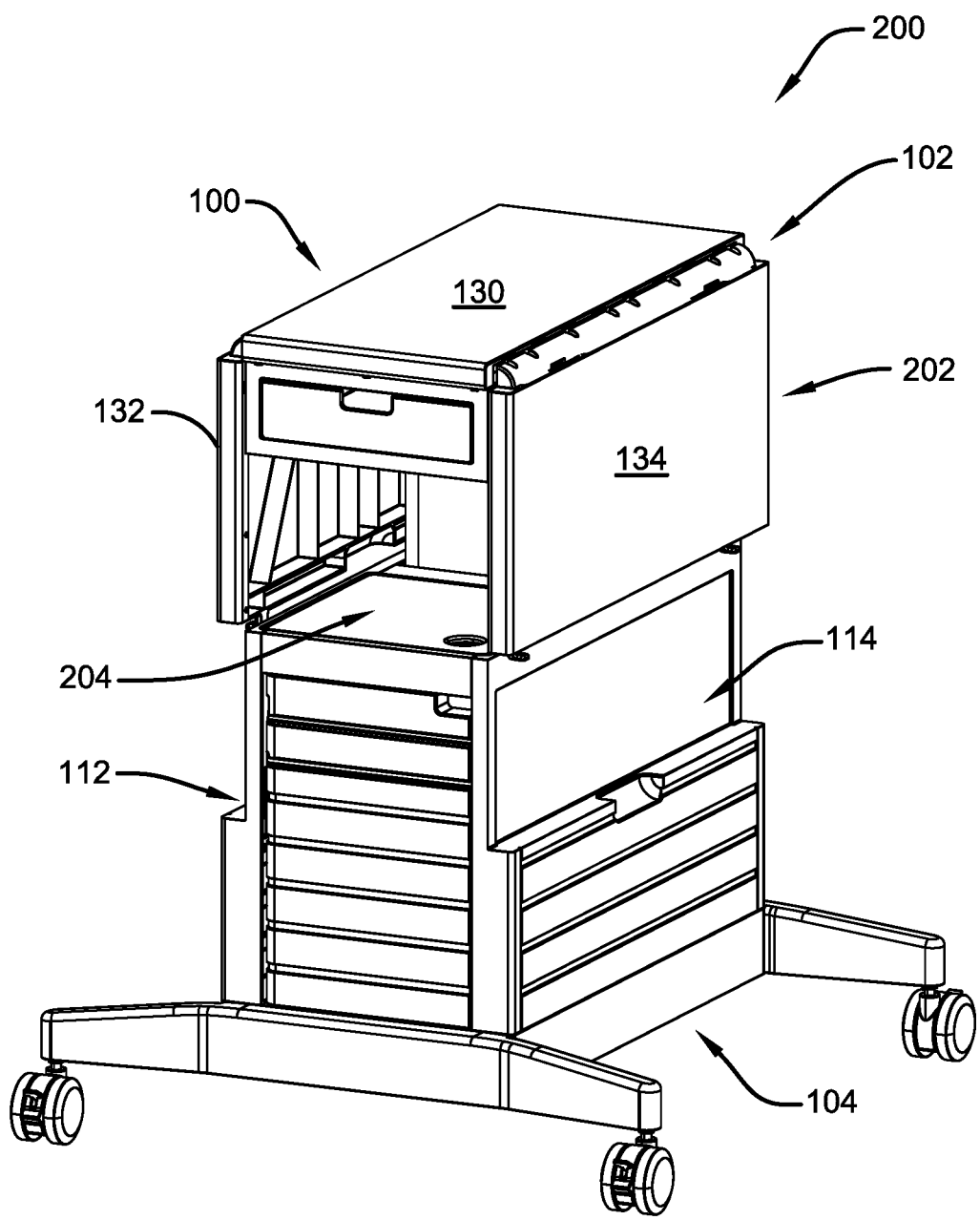
FIGS. 2A, 2B and 2C are component diagrams illustrating various views of a perspective of an exemplary cart in various positions in accordance with one or more systems described herein.
Figure 2B:
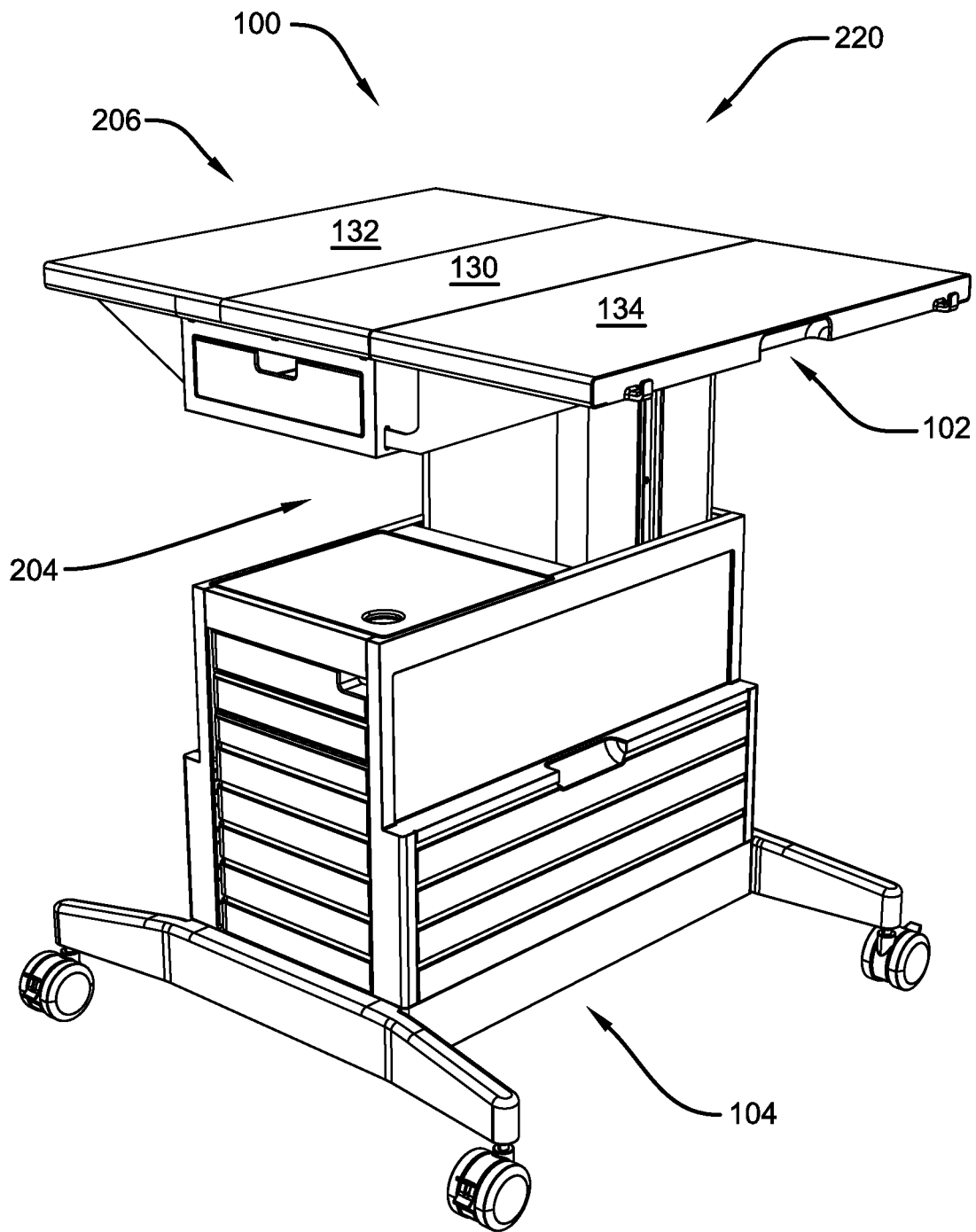
Figure 2C:
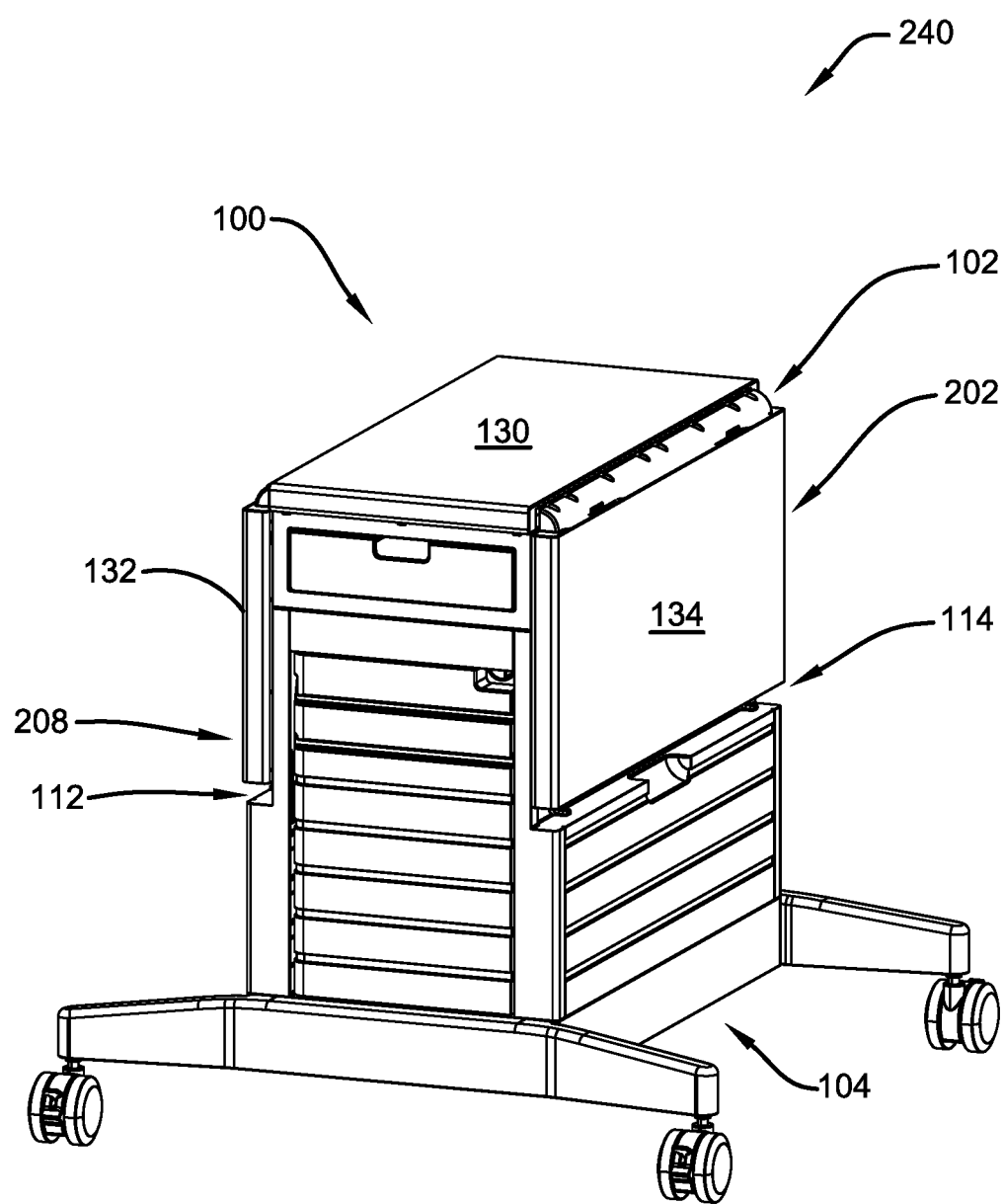

For illustrative purposes, FIGS. 2A, 2B, and 2C illustrate example implementations 200, 220, 240 of the exemplary cart 100 in various positions. As shown in the example implementation 200, the cart 100 is disposed with the respective first folding wing (first folding work surface) 132 and second folding wing (second folding work surface) 134 in the stowed position 202. As shown, the respective wings 132, 134 are folded downward (e.g., substantially perpendicular to the fixed working surface 130. Further, the top section 102 is disposed in the raised position 204 with respect to the base section 104.

As shown in the example implementation 220, the cart 100 is disposed with the respective first folding wing (first folding work surface) 132 and second folding wing (second folding work surface) 134 in the extended position 206. As shown, the respective wings 132, 134 are extended upward (e.g., substantially planar with the fixed working surface 130. Further, the top section 102 is disposed in the raised position 204 with respect to the base section 104.

As shown in the example implementation 240, the cart 100 is disposed with the respective first folding wing (first folding work surface) 132 and second folding wing (second folding work surface) 134 in the stowed position 202. As shown, the respective wings 132, 134 are folded downward (e.g., substantially perpendicular to the fixed working surface 130. Further, the top section 102 is disposed in the lowered position 208 with respect to the base section 104. Additionally, as illustrated, the first folding wing 132 is disposed in the first external recess 112, and the second folding wing 134 is disposed in the second external recess 114.

Figure 3:
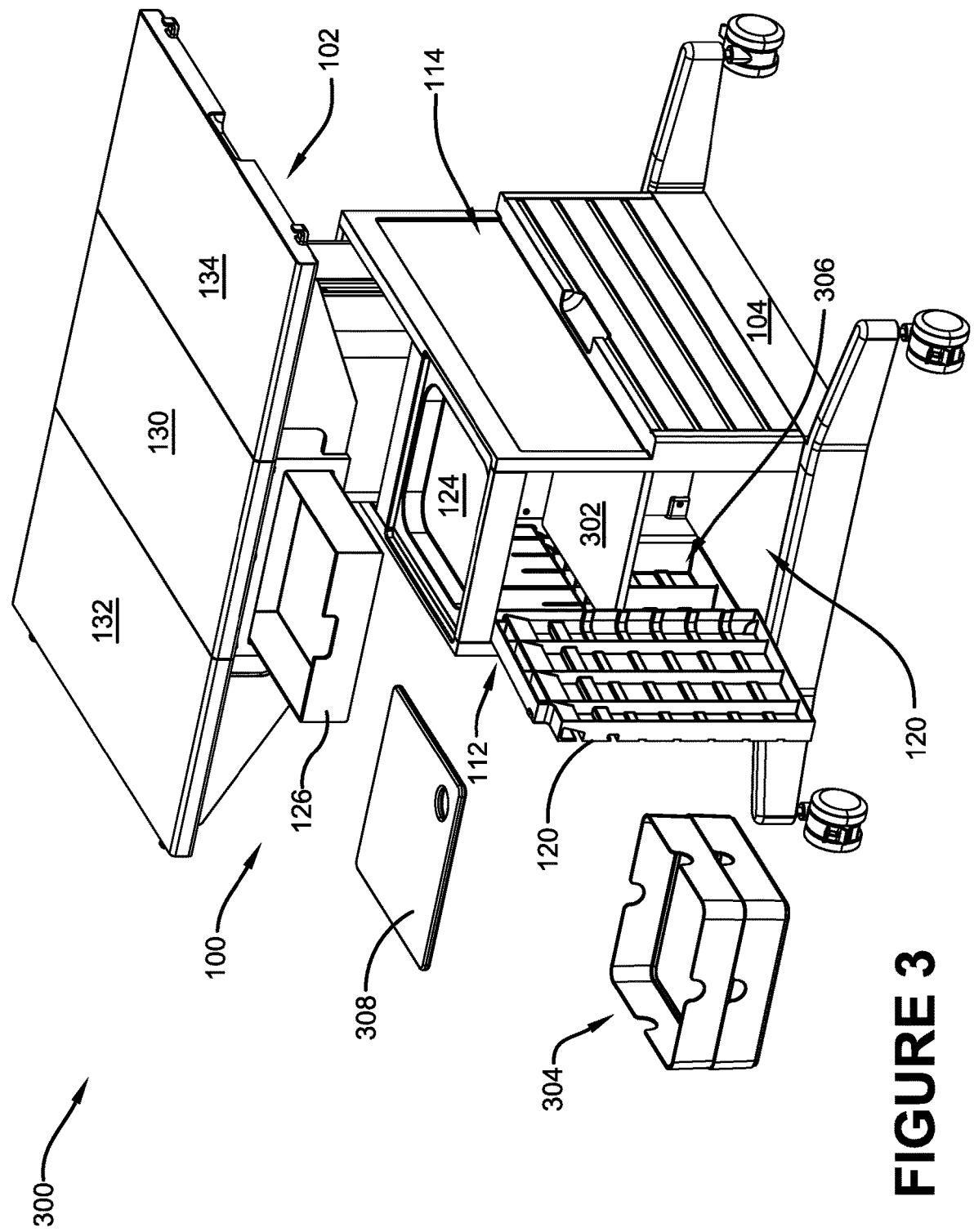
FIG. 3 is a component diagram illustrating one implementation of one or more portions of one or more systems described herein.

FIG. 3 is an illustrative example of the exemplary cart 100 in another implementation 300. As illustrated, the drawer 126 is shown extended out from the from the top section 102. Further, the compartment door 120 is shown in an open position, providing access to the compartment 120 in the base section 104. As shown, the compartment 120 is configured to hold one or more shelves 302, and/or one or more trays 304. For example, the interior walls 306 of the compartment 120 can comprise cleats, fixtures, or other engagement components that can allow the shelf or tray to be operably held in the compartment 120. Additionally, a cutting board 308 can be selectably removed from or placed in the third external recess 124 of the base section 104.

Figure 4A:
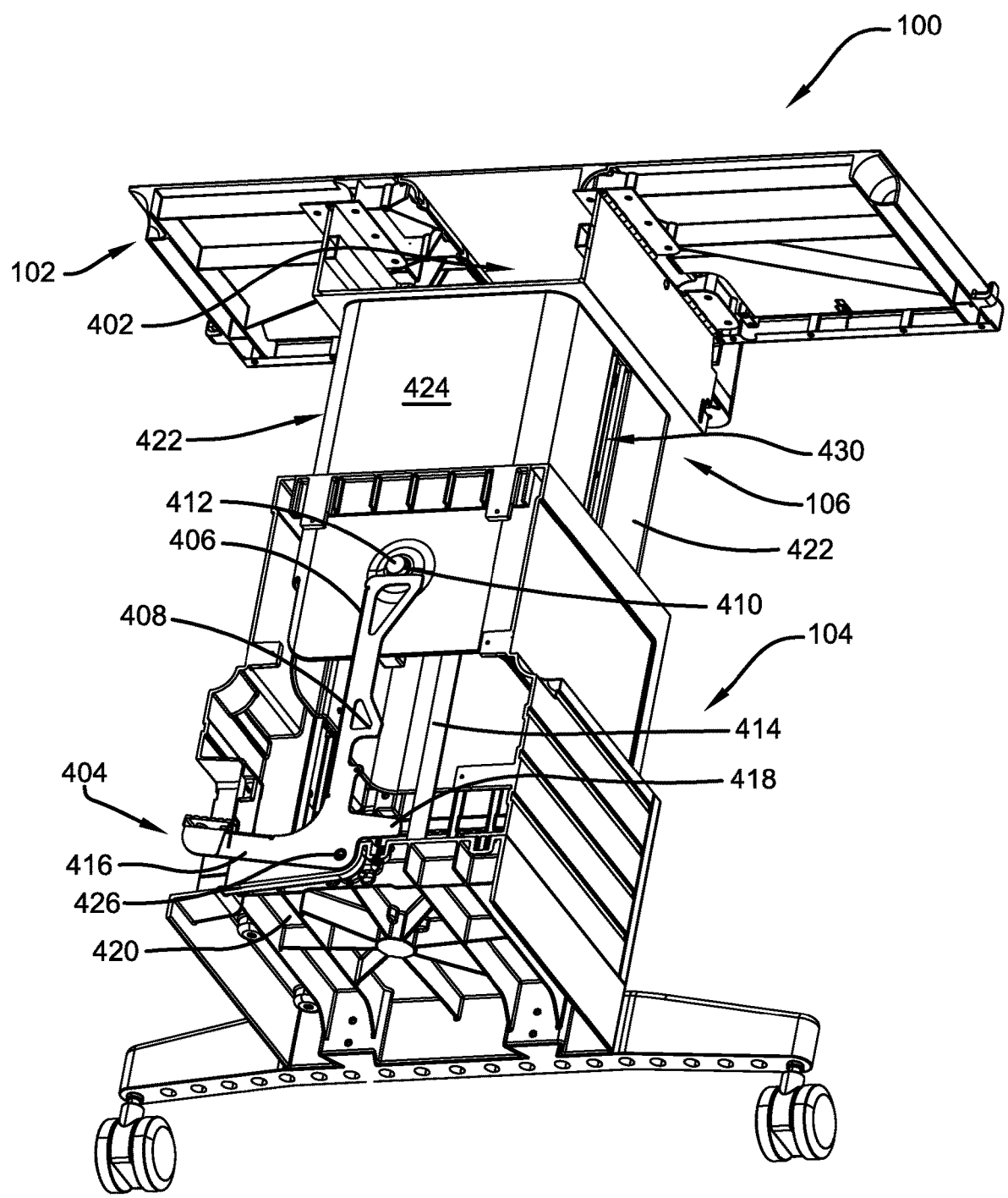
FIGS. 4A and 4B are component diagrams illustrating various cut-away views of one or more portions of an exemplary cart in accordance with one or more systems described herein.
Figure 4B:
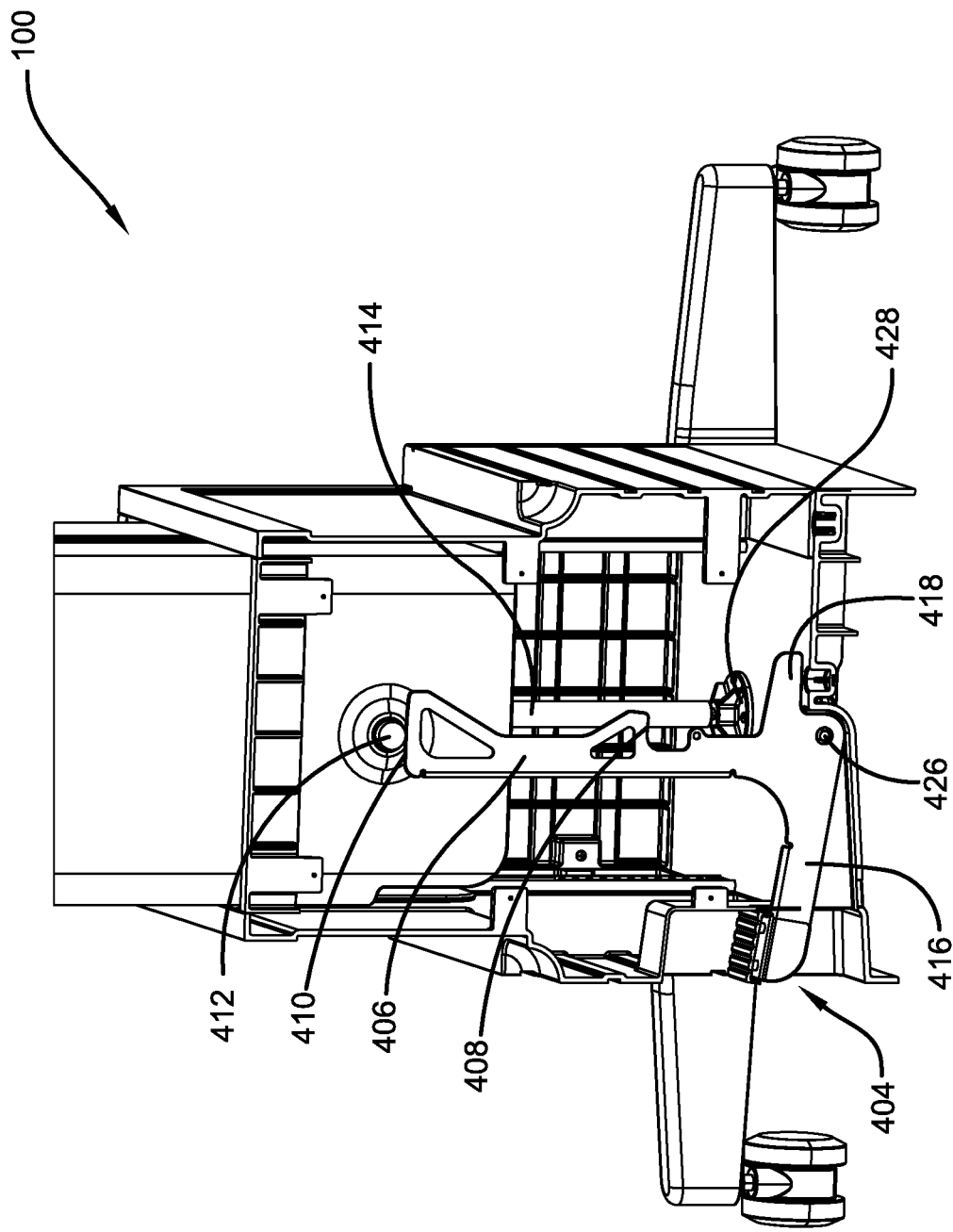

FIGS. 4A and 4B, with continued reference to FIGS. 1A-1D, and 2A-2C, are component diagrams that illustrate views of an example implementation of at least a portion of an example cart 100, in cut-away. In FIGS. 4A-B, the neck section 106 of the example cart 100 comprises a pair of side walls 422 and a neck front wall 424. Further, the top section 102 comprises a drawer internal recess 402, as described above, in which the drawer 126 may be operably disposed. The example cart 100 comprising an actuator 404 that, when activated, releases the top section 102 resulting in the top section 102 translating between the lowered first position 208 and a raised second position 204. As one example, as illustrated, the actuator can comprise a pedal activated lever assembly, comprising an actuator pivot point 426, a lever arm 406, and an actuator arm 416. For example, when the pedal is activated (e.g., depressed), the actuator arm 416 pivots at the pivot point 426, which pivots the lever arm 406 to release the top section 102.

In some implementations, the lever arm 406 can comprise a first stop 408 and a second stop 410. In this implementation, the first stop 408 can be configured to mitigate translation of the top section 102 from the lowered first position 208 to the raised second position 204. The second stop 410 can be configured to mitigate translation of the top section 102 from the raised second position 204 to the lowered first position 208. As illustrated, a neck stop 412 may be fixed to the neck section 106, such as at the front wall 424. In one implementation, the neck stop may operably interact with the first and second stops 408, 410 to adjust and hold the top section in the respective positions 204, 208. That is, for example, as illustrated in FIGS. 4A and 4B, the neck stop 412 can be disposed beneath the first stop in the lowered position 208 to mitigate the neck section 106 from moving upward. Further, the neck stop 412 can be disposed above the second stop 410 in the raised position 204 to mitigate the neck section 106 from being lowered.

In one implementation, an actuator spring can be coupled with the actuator 404 (e.g., either at the actuator arm 416 or lever arm 406), to bias the actuator toward a default or neutral position (e.g., as illustrated). For example, the default or neutral may dispose the respective lever arm stops 408, 410 in their stopping position. Therefore, as illustrated, the default position disposes the lever arm 406 in a substantially vertical position. As such, in this example, when the pedal is depressed the lever arm 406 pivots away from vertical, allowing the neck stop 412 to bypass the respective lever arm stops 408, 410, allowing the top section 102 to translate between the lowered 208 and raised 204 positions. Further, in this implementation, when the pedal is released, for example, the actuator spring biases the lever arm back to vertical to hold the neck stop 412 in either the raised or lowered positions 204, 208.

Additionally, the actuator 404 can comprise an actuator stop 418 that is configured to mitigate movement of the actuator past a desired point of operation. As an example, the actuator stop 418 can be used to stop the actuator from pivoting the lever arm 406 past vertical, such that the neck stop 412 may operably remain in contact with the second stop 410 (e.g., at the raised position). In this way, for example, the neck stop 412 may not accidently disengage from the lever arm 406 if the lever arm 406 pivots past the desired vertical position. In this implementation, the base section 104 comprises a base lower plate 420, which can operably engage with the actuator stop 418 to mitigate rotation of the lever arm 406 past the desired position.

It should be appreciated that, while the implementation described above discloses the top section or top surface 102 being disposed merely in a lowered 208 or raised 204 position, alternate implementations may allow for the top section 102 to be operably disposed in a plurality of positions between the lowered 208 and raised 204 positions. That is, for example, in some implementations, the top section 102 can be disposed in the lowered first position 204, the raised second position, a mid third position, a mid fourth position, etc. In these implementations, the top section 102 may be adjustable to a plurality of positions between the lowered 208 and raised 204 positions.

Figure 5:
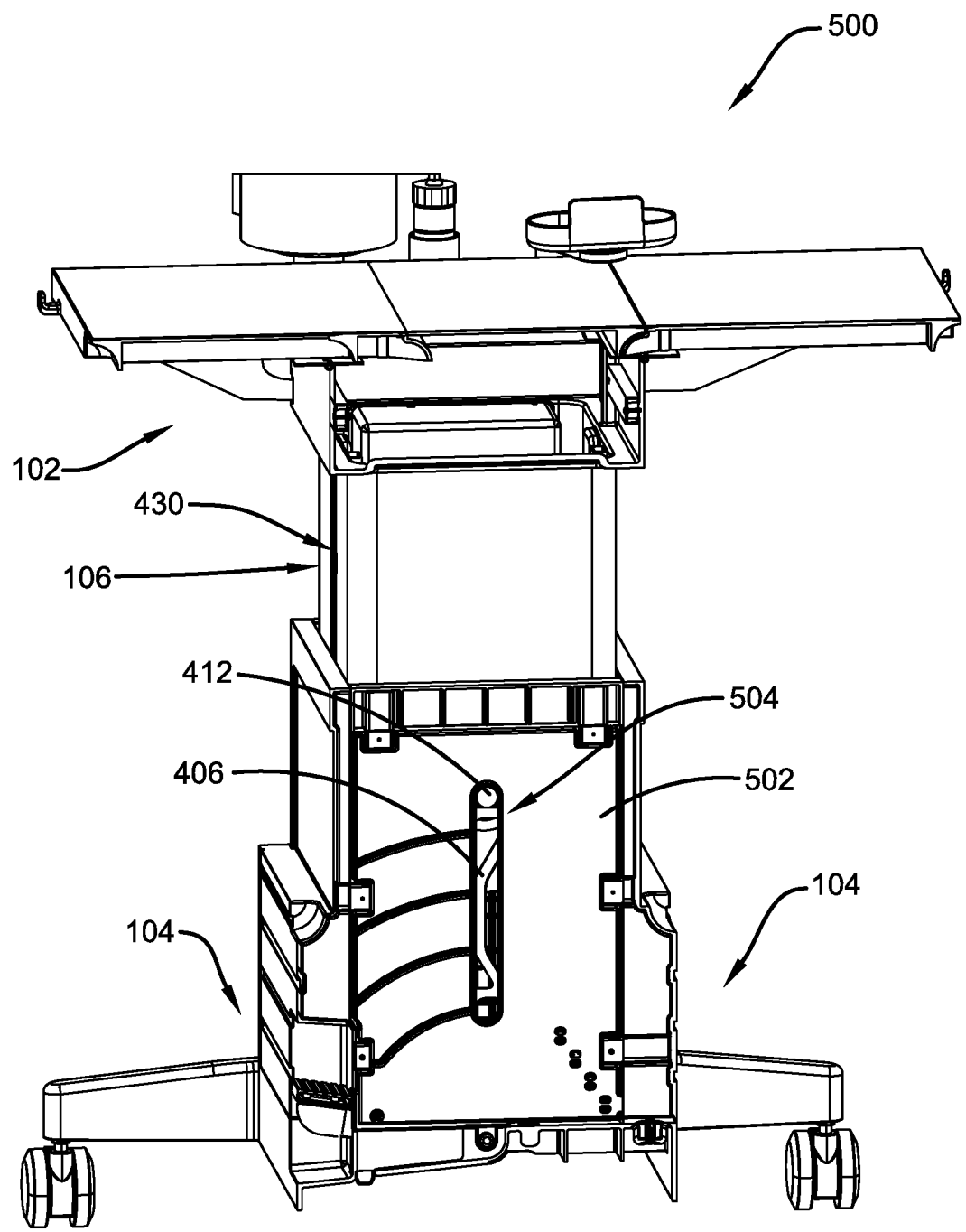
FIG. 5 is a component diagram illustrating a cut-away view of one implementation of one or more portions of one or more systems described herein.
Figure 6A:
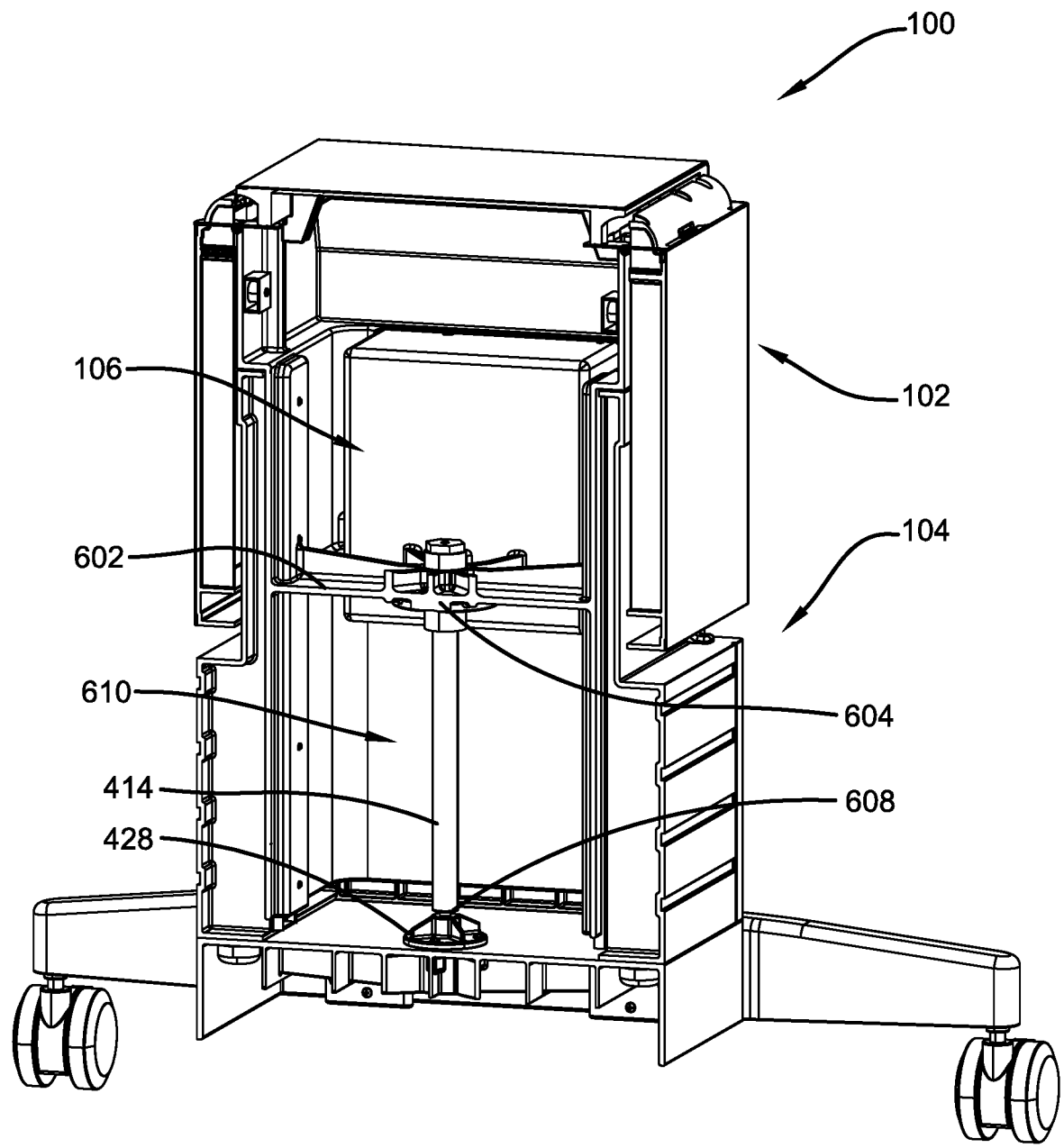
FIGS. 6A and 6B are component diagrams illustrating various cut-away views of one or more portions of an exemplary cart in accordance with one or more systems described herein.
Figure 6B:
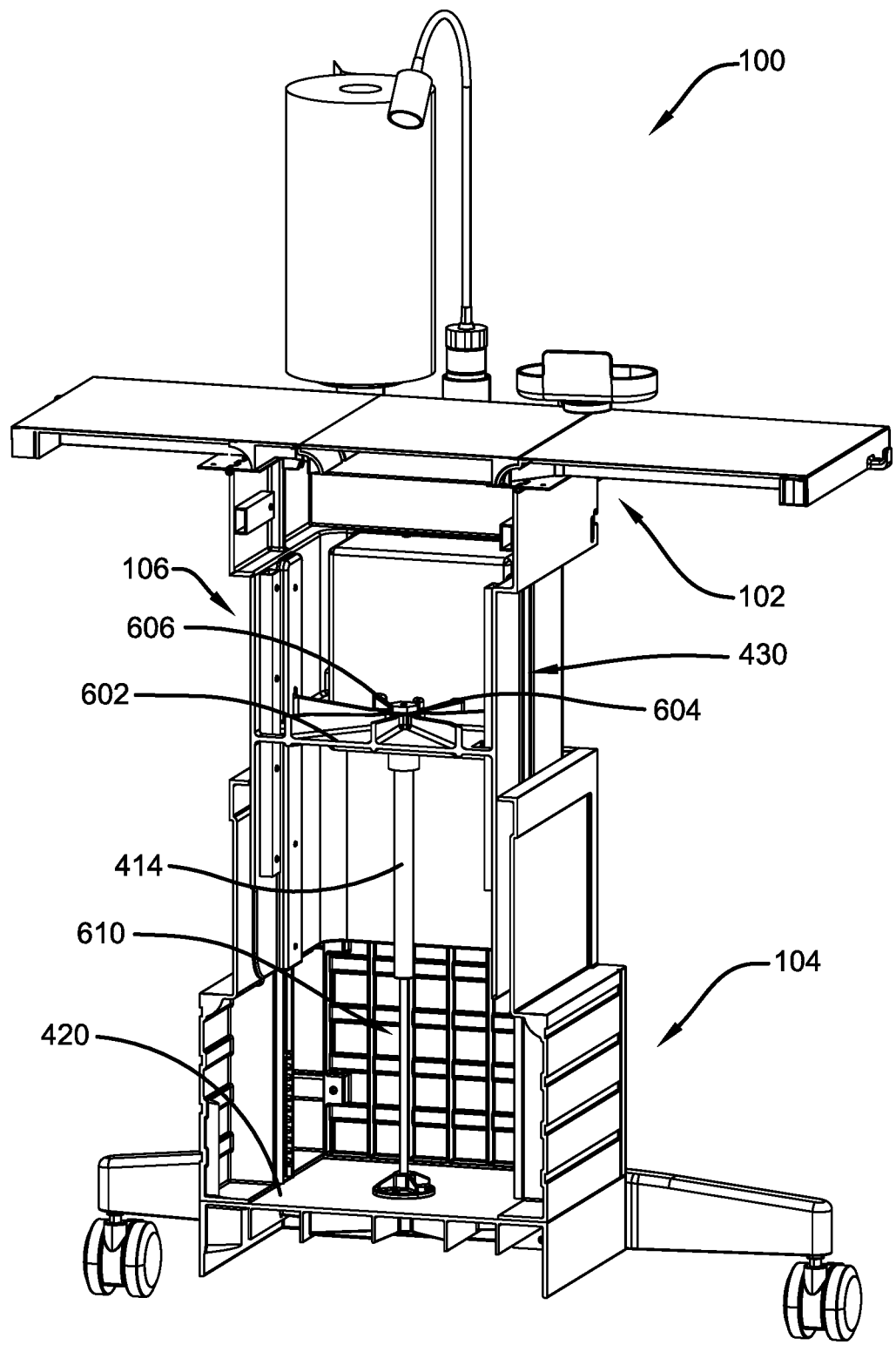

FIGS. 5, 6A, and 6B are component diagrams that further illustrate views of one or more portions of an implementation of an example cart, in cut-away. With continued reference to FIGS. 1-4, implementation 500 of FIG. 5 shows a cut-away view from front to back of an example cart. Implementation 500 shows a midwall 502 that is disposed between a rear and front of the base section 104. For example, at least a portion of the midwall 502 can form a rear wall of the utility compartment 122, and/or a front wall of a rear mechanical compartment of the base section 104. In this implementation, the midwall can comprise a midwall slot that is configured to operably hold the neck stop 412, and merely allow it to translate between a top and bottom of the midwall slot 504. That is, for example, the neck stop 412 may fit in the slot, and the slot 504 can act as a guide to allow the neck stop 412 to move up and down; limiting the neck stop 412 from going past the top or bottom, and mitigating movement from side-to-side. In this way, for example, the top section 102 may merely be allowed to move between two positions (e.g., top and bottom), and the side-to-side movement can be stabilized.

FIG. 6A shows the example cart 100 in the lowered first position, and FIG. 6B shows the cart 100 in the raised second position. The example cart can comprise a spring 414 that is operably, fixedly engaged with the base section 104. The spring 414 can apply a biasing force to the top section 102 toward the raised second position 204 (FIG. 6B). For example, the spring 414 can comprise any appropriately engineered biasing component that applies a biasing force upward to move the top section 102 upward with respect to the base section 104. For example, the spring 414 can comprise a coiled spring, a piston, a compressed air spring, any mechanical spring, or any mechanical system that applies the upward force (e.g., an electro-mechanical actuator). In one implementation, the spring 414 can be operably, fixedly engaged with the top section 102, and/or a neck lower plate 602 disposed in the neck section 106.

In some implementations, the spring 414 can comprise a spring top 606 and spring base 608. The spring top 606 can be operably coupled with a spring top coupler 604 disposed in the neck lower plate 602. Further, the spring base 608 can be operably coupled with a spring base coupler 428 disposed in the base lower plate 420. In this way, as illustrated in FIG. 6A, the spring 414 is operably engaged with the base section 104 and neck section 106, which is engaged with the top section 102. In FIG. 6A, the spring is disposed in a compressed position, with the cart in a lowered position. For example the biasing force is configured to apply force in an upward direction to move the top section 102 upward to the raised position; but, the first stop 408 acts to mitigate the upward movement of the neck stop 412, thereby maintaining the top section 102 in the lowered position when the actuator 404 is disposed in the default or neutral position.

As illustrated in FIG. 6B, the top section is disposed in the raised position. However, for illustrative purposes (e.g., to show the top of the spring 606, and neck lower plate 602), the spring 414 is shown detached from the neck lower plate 602. In operation, the spring 414 in FIG. 6B would be extended to the location of the spring to coupler 604, to be coupled with the neck lower plate 602. For example, when the actuator 404 is activated (e.g., pedal is depressed) the lever arm 406 pivots, which releases the neck stop 412 from engagement with the first stop 408. In this example, because lateral movement of the neck stop 412 can be mitigated by the slot 504 in the midwall 502, the neck stop 412 remains in position while the lever arm 406 pivots to disengage the first stop 408. In this way, the biasing force of the spring 414 translates the top section 102 from the lowered position to the raised position, as the neck stop 412 moves between the bottom and top of the midwall slot 504. Further, the actuator can be release once the neck stop 412 has reached the top of the slot 504, and the second stop 410 mitigates downward translation of the top section 102 (such as when downward force is applied to the working surface 128) from the raised position.

In some implementations, one or more guides 430 can be disposed in the neck side walls 422, the neck front wall 424, and/or inside a mechanical compartment 610 of the base section 104. For example, the mechanical compartment 610 can comprise the spring 414, the neck section 106 when lowered, and/or other components such as the actuator parts. As an example, the one or more guides 430 may be used to guide the telescoping action of the neck section 106 when it is telescoped into and out of the base section 104, such as in the mechanical compartment 610. For example, the guides 430 can provide for stability from lateral movement of the neck during translation between the lowered and raised positions.

FIGS. 7A, 7B, and 7C illustrate various views of an example cart 100 in one implementation, such as when stowed. In this example, a standard sized outdoor grill 700 can comprise one or more side shelves 702. As an example, outdoor grills utilize a typically standard height shelf, having a typically standard height of space 706 between the bottom of the shelf 702 and the ground. Further, the top 704 of a typical side shelf 702 of the outdoor grill stands at a substantially standard height (e.g., similar to countertop height). In these examples, the example cart is disposed in a lowered and stowed position, with the top down and wings down for example. As illustrated, wheels 108, 108' are engaged with legs 110, 110' extending horizontally from the cart, at the bottom. In this implementation, the respective legs 110, 110', and therefore the wheels 108, 108' are on either side of a side of the grill base 708 (e.g., cabinet or legs). In this way, as illustrated, for example, the cart 100 may be stored under the shelf 702 of the outdoor grill 700.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A cart, comprising:
   a base section comprising:
   a base compartment accessible by an access door, the base compartment configured to selectably receive and hold one or more trays;
   a set of two or more wheels disposed at a bottom of the base section;
   a plurality of slats disposed on an exterior of the base section configured to selectably receive and hold one or more accessories;
   a first side wall comprising a first external recess; and
   a second side wall comprising a second external recess; and
   a top section operably disposed above the base section, the top section selectably extendable from the base section between a lowered first position and a raised second position, the top section comprising a top working surface, the top working surface comprising a first foldable wing selectably folding between a stowed first position and an extended second position and a second foldable wing that is selectably foldable between a stowed third position and an extended fourth position, wherein the first external recess is configured to receive the first foldable wing in the stowed first position and the second external recess is configured to receive the second foldable wing in the stowed third position.

2. The cart of claim 1, wherein the lowered first position disposes the cart at a total height sized to fit the cart underneath a side shelf on an outdoor grill.

3. The cart of claim 1, comprising a neck section engaged with, and between, the top section and the bottom section, the neck section operably telescoping out of the base section to translate the top section between the lowered first position and a raised second position.

4. The cart of claim 3, the neck section comprising a rear compartment accessible from a rear wall of the neck section.

5. The cart of claim 1, comprising a spring operably, fixedly engaged with the base section, the spring applying a biasing force to the top section toward the raised second position.

6. The cart of claim 5, the spring operably, fixedly engaged with one of:
   the top section;
   a lower plate in the neck section.

7. The cart of claim 1, a top wall of the base section comprising a third external recess operably holding a selectably removable cutting board.

8. The cart of claim 1, the top section comprising a drawer accessible from a front of the top section.

9. The cart of claim 1, comprising an actuator that, when activated, releases the top section resulting in the top section translating between the lowered first position and a raised second position.

10. The cart of claim 9, the actuator comprising a lever arm, the lever arm comprising a first stop and a second stop, the first stop configured to mitigate translation of the top section from the lowered first position to the raised second position, and the second stop configured to mitigate translation of the top section from the raised second position to the lowered first position.

11. The cart of claim 10, further comprising a neck section that operably engages with the first stop and the second stop.

12. A cart, comprising:
    a base section comprising:
    a base compartment accessible by an access door, the base compartment configured to selectably receive and hold one or more trays;
    a set of two or more wheels disposed at a bottom of the base section; and
    a plurality of slats disposed on an exterior of the base section configured to selectably receive and hold one or more accessories; and
    a top section operably disposed above the base section, the top section selectably extendable from the base section between a lowered first position and a raised second position, the top section comprising:
    a top working surface, the top working surface comprising a first foldable wing selectably folding between a stowed first position and an extended second position; and
    an accessory attachment panel at a rear side, the accessory attachment panel configured to operably hold one or more accessories that are accessible from the top working surface.

13. The cart of claim 12, wherein the lowered first position disposes the cart at a total height sized to fit the cart underneath a side shelf on an outdoor grill.

14. The cart of claim 12, the top section comprising a drawer accessible from a front of the top section.

15. The cart of claim 12, comprising an actuator that, when activated, releases the top section resulting in the top section translating between the lowered first position and a raised second position.

16. The cart of claim 15, the actuator comprising a lever arm, the lever arm comprising a first stop and a second stop, the first stop configured to mitigate translation of the top section from the lowered first position to the raised second position, and the second stop configured to mitigate translation of the top section from the raised second position to the lowered first position.

17. A cart, comprising:
    a base section comprising:
        a base compartment accessible by an access door, the base compartment configured to selectably receive and hold one or more trays;
        a set of two or more wheels disposed at a bottom of the base section, wherein at least two of the wheels respectively disposed on a leg that extends horizontally from the base section, a pair of respective legs spaced apart to operably fit a side of an outdoor grill between; and
        a plurality of slats disposed on an exterior of the base section configured to selectably receive and hold one or more accessories; and
    a top section operably disposed above the base section, the top section selectably extendable from the base section between a lowered first position and a raised second position, the top section comprising a top working surface, the top working surface comprising a first foldable wing selectably folding between a stowed first position and an extended second position.

18. The cart of claim 17, wherein the lowered first position disposes the cart at a total height sized to fit the cart underneath a side shelf on the outdoor grill.

19. The cart of claim 17, the top section comprising a drawer accessible from a front of the top section.

20. The cart of claim 17, comprising an actuator that, when activated, releases the top section resulting in the top section translating between the lowered first position and a raised second position, the actuator comprising a lever arm, the lever arm comprising a first stop and a second stop, the first stop configured to mitigate translation of the top section from the lowered first position to the raised second position, and the second stop configured to mitigate translation of the top section from the raised second position to the lowered first position.

* * * * *